United States Patent
Hisazumi et al.

(10) Patent No.: US 8,292,019 B2
(45) Date of Patent: Oct. 23, 2012

(54) SHOCK ABSORBING STRUCTURE FOR VEHICLE

(75) Inventors: Makoto Hisazumi, Wako (JP); Kenichiro Soyama, Wako (JP); Yoshiyuki Toba, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 145 days.

(21) Appl. No.: 12/905,669

(22) Filed: Oct. 15, 2010

(65) Prior Publication Data

US 2011/0088960 A1    Apr. 21, 2011

(30) Foreign Application Priority Data

Oct. 16, 2009  (JP) ................................. 2009-239018
Apr. 6, 2010   (JP) ................................. 2010-087609

(51) Int. Cl.
*B62D 21/15*    (2006.01)
*B60N 2/427*    (2006.01)

(52) U.S. Cl. .................... 180/274; 280/784; 296/187.08; 296/187.12; 296/68.1; 297/216.18

(58) Field of Classification Search .................. 180/271, 180/274; 280/784, 727, 730.2; 296/187.01, 296/187.03, 187.05, 187.08, 187.12, 193.07, 296/68.1, 65.11, 1.04; 297/216.1, 216.16, 297/216.18

See application file for complete search history.

(56) References Cited

U.S. PATENT DOCUMENTS

| | | | |
|---|---|---|---|
| 4,396,220 A * | 8/1983 | Dieckmann et al. ......... 296/68.1 |
| 4,514,008 A * | 4/1985 | Watanabe et al. ............. 296/204 |
| 5,000,509 A * | 3/1991 | Sinnhuber et al. ....... 296/187.12 |
| 5,172,790 A * | 12/1992 | Ishikawa et al. .............. 180/268 |
| 5,584,525 A * | 12/1996 | Nakano et al. ................ 296/68.1 |
| 6,237,991 B1 * | 5/2001 | Weber ........................ 296/187.12 |
| 6,299,238 B1 * | 10/2001 | Takagi et al. ............. 296/187.12 |
| 6,394,215 B1 * | 5/2002 | Masuda ......................... 180/232 |
| 7,104,592 B2 * | 9/2006 | Song ........................ 296/187.12 |
| 7,124,851 B2 * | 10/2006 | Smith et al. .................... 180/274 |
| 7,328,938 B2 * | 2/2008 | Matsuda .................. 296/187.12 |
| 7,377,550 B2 * | 5/2008 | Lee ................................. 280/803 |
| 7,387,327 B2 * | 6/2008 | Tencer et al. ................. 296/68.1 |
| 7,540,343 B2 * | 6/2009 | Nakashima et al. ......... 180/65.1 |
| 7,600,807 B2 * | 10/2009 | Bachmann .............. 296/187.08 |
| 7,854,470 B2 * | 12/2010 | Yamaki et al. ............ 296/187.12 |
| 2008/0061538 A1 * | 3/2008 | Mohammad et al. ....... 280/730.2 |
| 2010/0001553 A1 * | 1/2010 | Yoda ........................ 296/193.07 |

FOREIGN PATENT DOCUMENTS

| | | |
|---|---|---|
| JP | 2007-320348 | 12/2007 |
| JP | 2009-126332 | 6/2009 |
| JP | 2009-126333 | 6/2009 |
| JP | 2010-274802 | 12/2010 |

\* cited by examiner

*Primary Examiner* — Paul N Dickson
*Assistant Examiner* — Laura Freedman
(74) *Attorney, Agent, or Firm* — Rankin, Hill & Clark LLP (57) ABSTRACT

A shock absorbing member is supported on a shock absorbing member support bracket fixed onto a floor tunnel sandwiched between left and right front seats. Therefore, it is possible to allow the front seats to interfere with the shock absorbing member so that the member can absorb collision energy at a time of a side collision of a vehicle. Because a lower portion of a front wall connected to an inverted-U-shaped inner face of the shock absorbing member is connected to an upper portion of a front wall of the shock absorbing member support bracket, the front wall of the shock absorbing member support bracket receives a load of the side collision in a shearing direction. Accordingly, it is possible to increase strength of the front wall of the shock absorbing member support bracket against the side collision, prevent the shock absorbing member from falling down sideways, and enhance the shock absorbing effect.

6 Claims, 6 Drawing Sheets

SHOCK ABSORBING STRUCTURE FOR VEHICLE

BACKGROUND OF THE INVENTION

1. Field of the Invention

The present invention relates to a shock absorbing structure for a vehicle, which includes a shock absorbing member supported on a shock absorbing member support bracket fixed onto a floor tunnel sandwiched between left and right front seats and in which the front seats are caused to interfere with the shock absorbing member to absorb collision energy at the time of a side collision of the vehicle.

2. Description of the Related Art

Such a shock absorbing structure for a vehicle is known from Japanese Patent Application Laid-open No. 2007-320348.

In this structure, a base portion (shock absorbing member support bracket) and a shock absorber (shock absorbing member) are arranged in a double-decker shape on an upper face of a floor tunnel of a vehicle. By providing higher strength to the upper shock absorber with which a seat interferes at the time of a side collision than to the lower base portion, shock absorbing effect is enhanced while reducing weight of the whole structure.

In this shock absorbing structure for a vehicle, a parking brake device is provided immediately in front of the shock absorbing member support bracket and the shock absorbing member. Therefore, brake cables extending from a brake lever to rear wheels interfere with the shock absorbing member support bracket. In this case, if an opening for allowing the brake cables to pass through is formed in the shock absorbing member support bracket, the strength of the shock absorbing member support bracket reduces and shock absorbing performance of the shock absorbing member support bracket and the shock absorbing member in total may be insufficient, even though the shock absorbing member has been made to have high strength.

SUMMARY OF THE INVENTION

The present invention has been made in view of the above-described circumstances and an object of the present invention is to increase the strength of a shock absorbing member support bracket provided onto a floor tunnel and to secure shock absorbing performance of a shock absorbing member supported on the shock absorbing member support bracket.

In order to achieve the object, according to a first feature of the present invention, there is provided a shock absorbing structure for a vehicle, which includes a shock absorbing member supported on a shock absorbing member support bracket fixed onto a floor tunnel sandwiched between left and right front seats and in which the front seats are caused to interfere with the shock absorbing member to absorb collision energy at the time of a side collision of the vehicle, wherein the shock absorbing member has a front wall connected to an inverted-U-shaped inner face at least including an upper walk and left and right side walls, and a lower portion of the front wall is connected to an upper portion of a front wall of the shock absorbing member support bracket.

With the above structure, the shock absorbing member is supported on the shock absorbing member support bracket fixed onto the floor tunnel sandwiched between the left and right front seats. Therefore, it is possible to allow the front seats to interfere with the shock absorbing member so that the member can absorb collision energy at a time of a side collision of the vehicle. Because the lower portion of the front wall connected to the inverted-U-shaped inner face of the shock absorbing member is connected to the upper portion of the front wall of the shock absorbing member support bracket, the front wall of the shock absorbing member support bracket receives a load of the side collision in a shearing direction. Accordingly, it is possible to increase strength of the front wall of the shock absorbing member support bracket against a side collision, prevent the shock absorbing member from falling down sideways, and enhance the shock absorbing effect.

According to a second feature of the present invention, in addition to the first feature, there is proposed the shock absorbing structure for a vehicle, wherein leg portions hanging from the left and right side walls of the shock absorbing member are placed over left and right side walls of the shock absorbing member support bracket and fixed.

With the above structure, the leg portions hanging from the left and right side walls of the shock absorbing member are placed over the left and right side walls of the shock absorbing member support bracket and fixed. Therefore, it is possible to firmly integrate the shock absorbing member with the shock absorbing member support bracket to enhance the shock absorbing effect.

According to a third feature of the present invention, in addition to the second feature, there is proposed the shock absorbing structure for a vehicle, wherein the left and right side walls of the shock absorbing member support bracket are inclined to approach each other as they extend upward, grooves are formed between the lower portion of the front wall and the leg portions of the shock absorbing member, and the leg portions are supported on outer faces of the left and right side walls of the shock absorbing member support bracket with the grooves engaged with the front wall of the shock absorbing member support bracket.

With the above structure, the left and right side walls of the shock absorbing member support bracket are inclined to approach each other as they extend upward, the grooves are formed between the lower portion of the front wall and the leg portions of the shock absorbing member, and the leg portions are supported on the outer faces of the left and right side walls of the shock absorbing member support bracket with the grooves engaged with the front wall of the shock absorbing member support bracket. Therefore, it is possible to easily and accurately position the shock absorbing member with respect to the shock absorbing member support bracket.

According to a fourth feature of the present invention, in addition to any one of the first to third features, there is proposed the shock absorbing structure for a vehicle, wherein the front wall of the shock absorbing member support bracket and a parking brake support bracket are fastened together to the floor tunnel.

With the above structure, the front wall of the shock absorbing member support bracket and the parking brake support bracket are fastened together to the floor tunnel. Therefore, it is possible to reduce the number of fastening members as compared with a case in which they are separately fastened to the floor tunnel.

According to a fifth feature of the present invention, in addition to the fourth feature, there is proposed the shock absorbing structure for a vehicle, wherein a rear wall of the shock absorbing member support bracket has an inspection window for maintenance of a brake cable of a parking brake device supported by the parking brake support bracket.

With the above structure, the rear wall of the shock absorbing member support bracket has the inspection window for maintenance of the brake cable. Therefore, it is possible to maintain the brake cable without detaching the shock absorbing member support bracket.

According to a sixth feature of the present invention, in addition to the fifth feature, there is proposed the shock absorbing structure for a vehicle, wherein notches through which the brake cables pass are formed in portions where the left and right side walls and the rear wall of the shock absorbing member support bracket are connected.

With the above structure, the notches through which the brake cables pass are formed in portions where the left and right side walls and the rear wall of the shock absorbing member support bracket are connected. Therefore, it is possible to arrange the brake cables not to interfere with the shock absorbing member support bracket.

According to a seventh feature of the present invention, in addition to the first feature, there is proposed the shock absorbing structure for a vehicle, wherein the front wall of the shock absorbing member support bracket has a U-shaped opening and a reinforcing bead portion, bent at an obtuse angle is formed at an end edge of the opening at at least one of left and right side portions of the front wall.

With the above structure, the front wall of the shock absorbing member support bracket has the U-shaped opening, thus it may reduce strength of the front wall when a collision load of a side collision is input. However, the reinforcing bead portion bent at the obtuse angle is formed at the end edge of the opening at at least one of the left and right side portions of the front wall. Accordingly, it is possible to further increase the strength of the front wall of the shock absorbing member support bracket against the side collision, prevent the shock absorbing member from falling down sideways, and enhance the shock absorbing effect.

The above description, other objects, characteristics and advantages of the present invention will be clear from detailed descriptions which will be provided for the preferred embodiments referring to the attached drawings.

BRIEF DESCRIPTION OF THE DRAWINGS

FIGS. 1 to 5 show a first embodiment of the present invention:

DESCRIPTION OF THE PREFERRED EMBODIMENTS

A first embodiment of the present invention will be described based on FIGS. 1 to 5.

Figure 1:
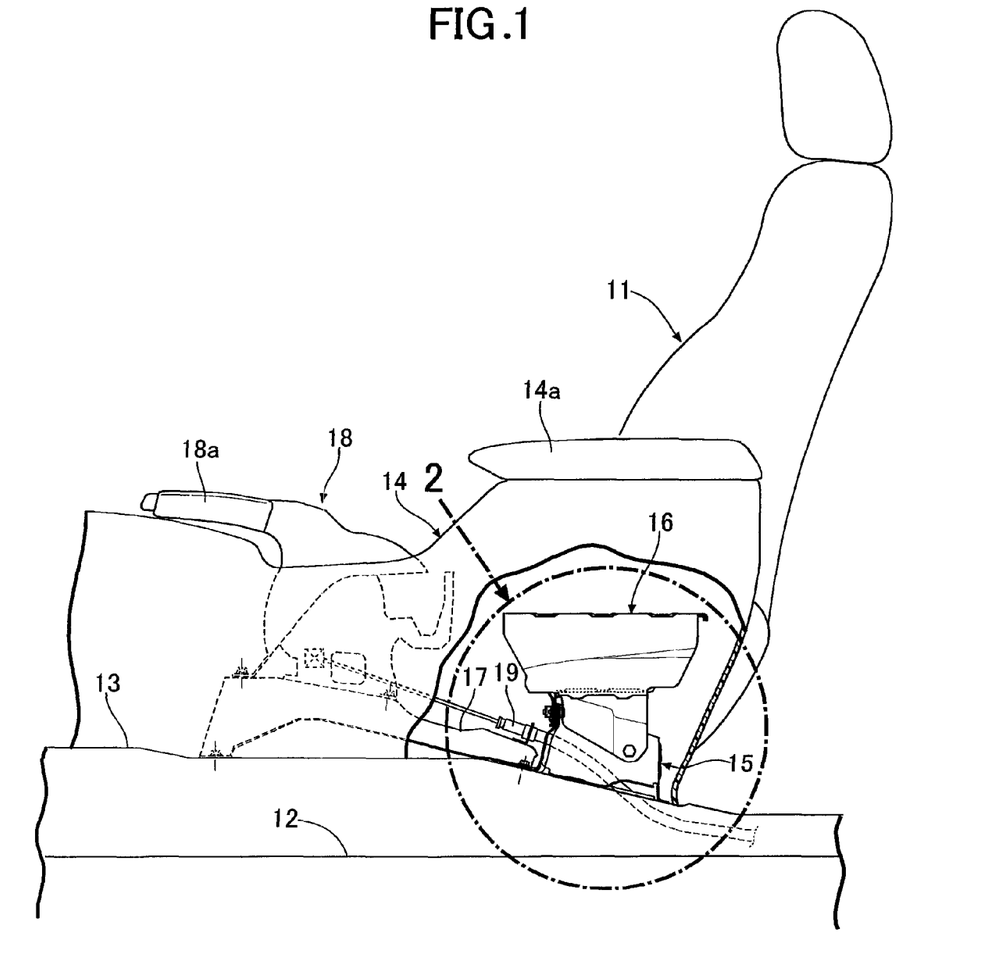
FIG. 1 is a side view of a front seat portion of an automobile.
Figure 2:
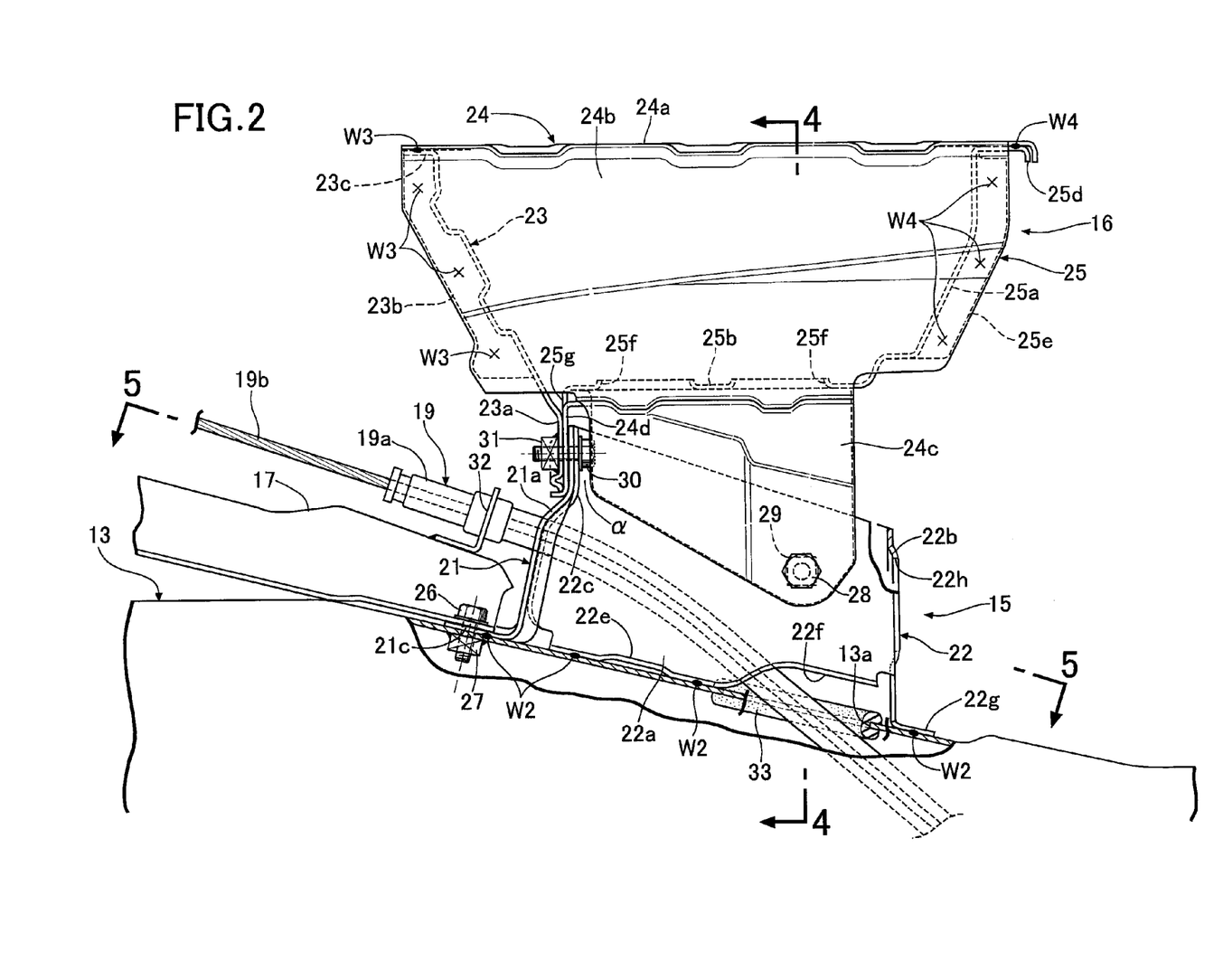
FIG. 2 is an enlarged view of a part indicated by an arrow 2 in FIG. 1.
Figure 3:
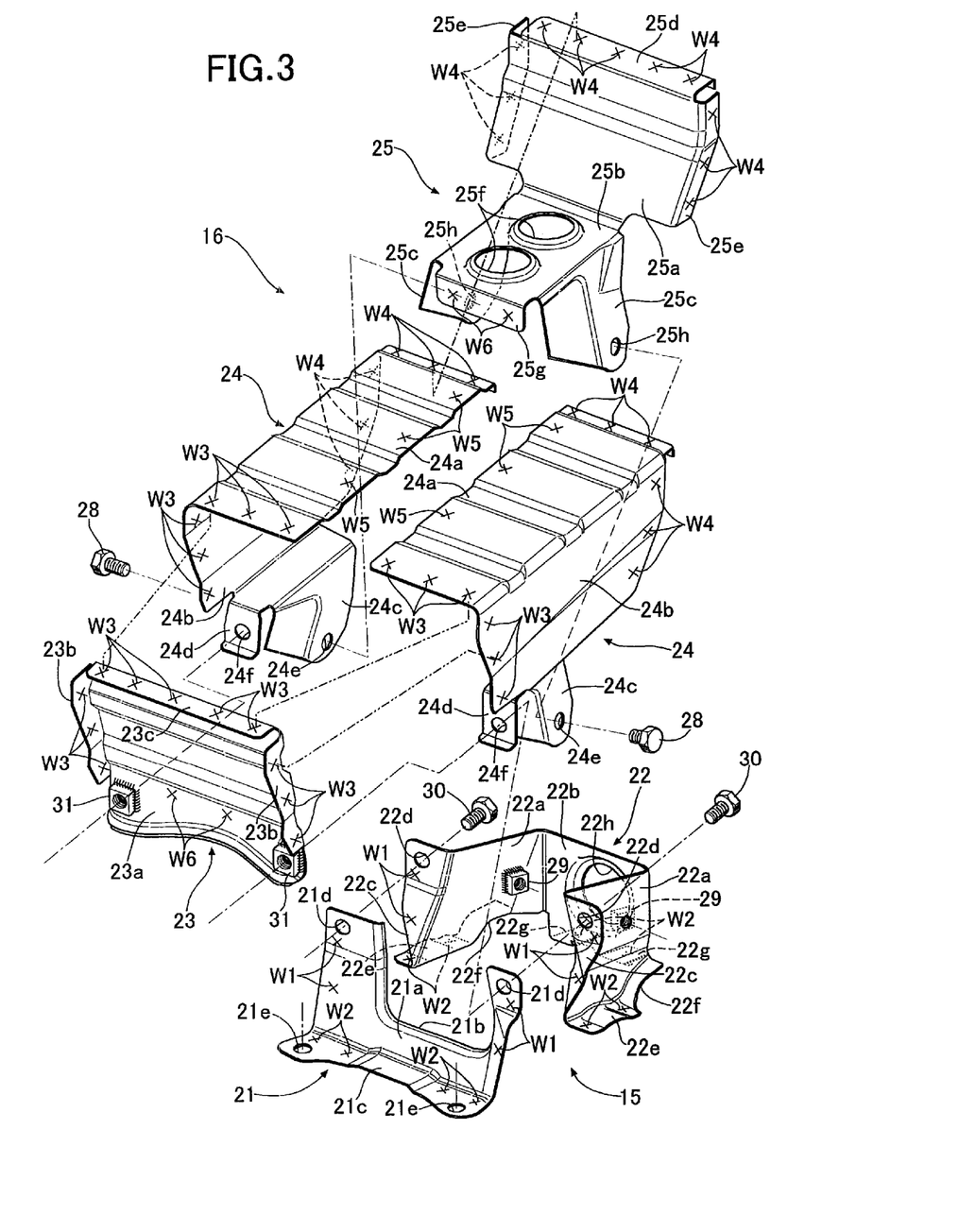
FIG. 3 is an exploded perspective view of a shock absorbing member.
Figure 4:
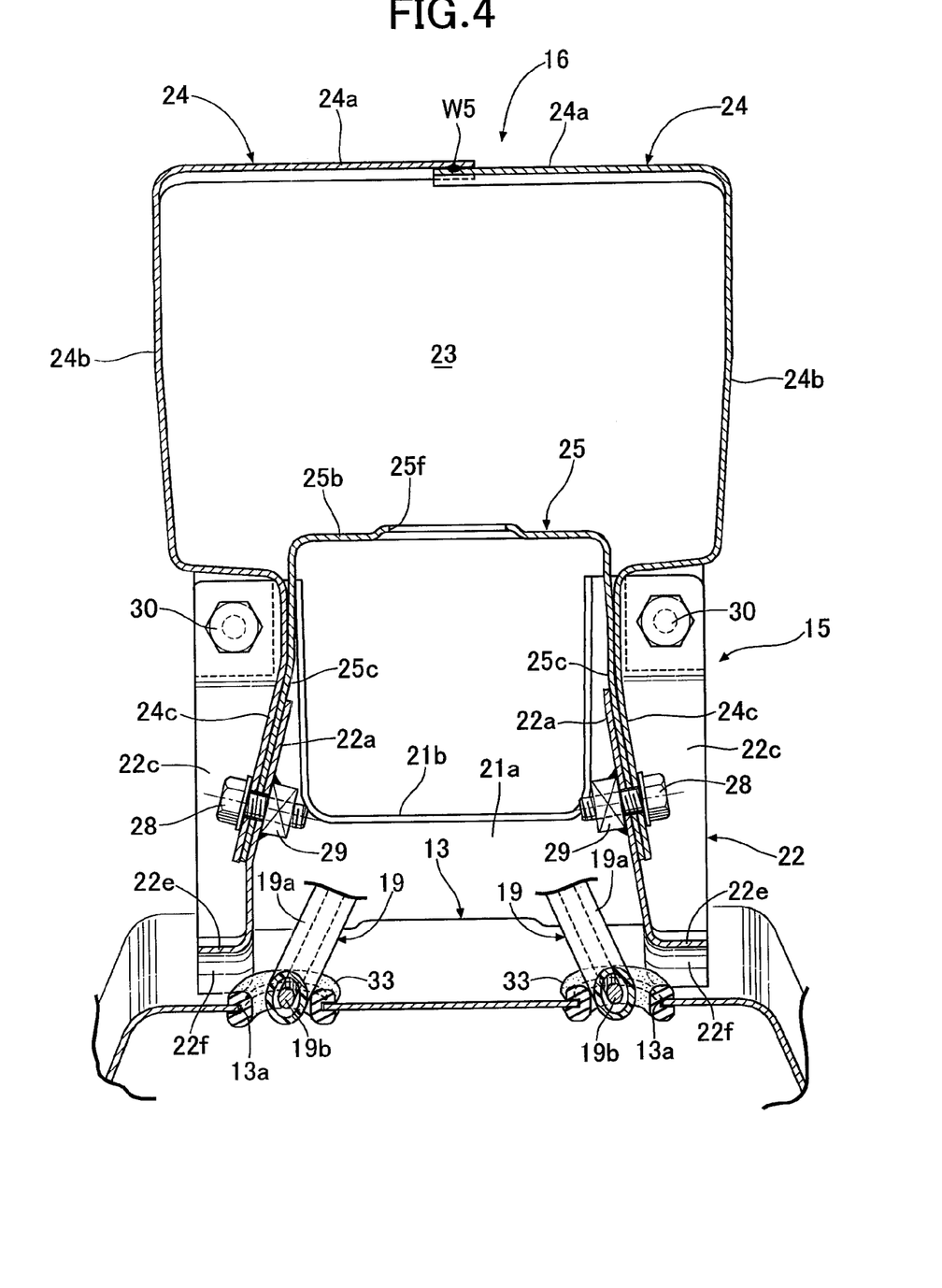
FIG. 4 is a cross-sectional view taken along a line 4-4 in FIG. 2.
Figure 5:
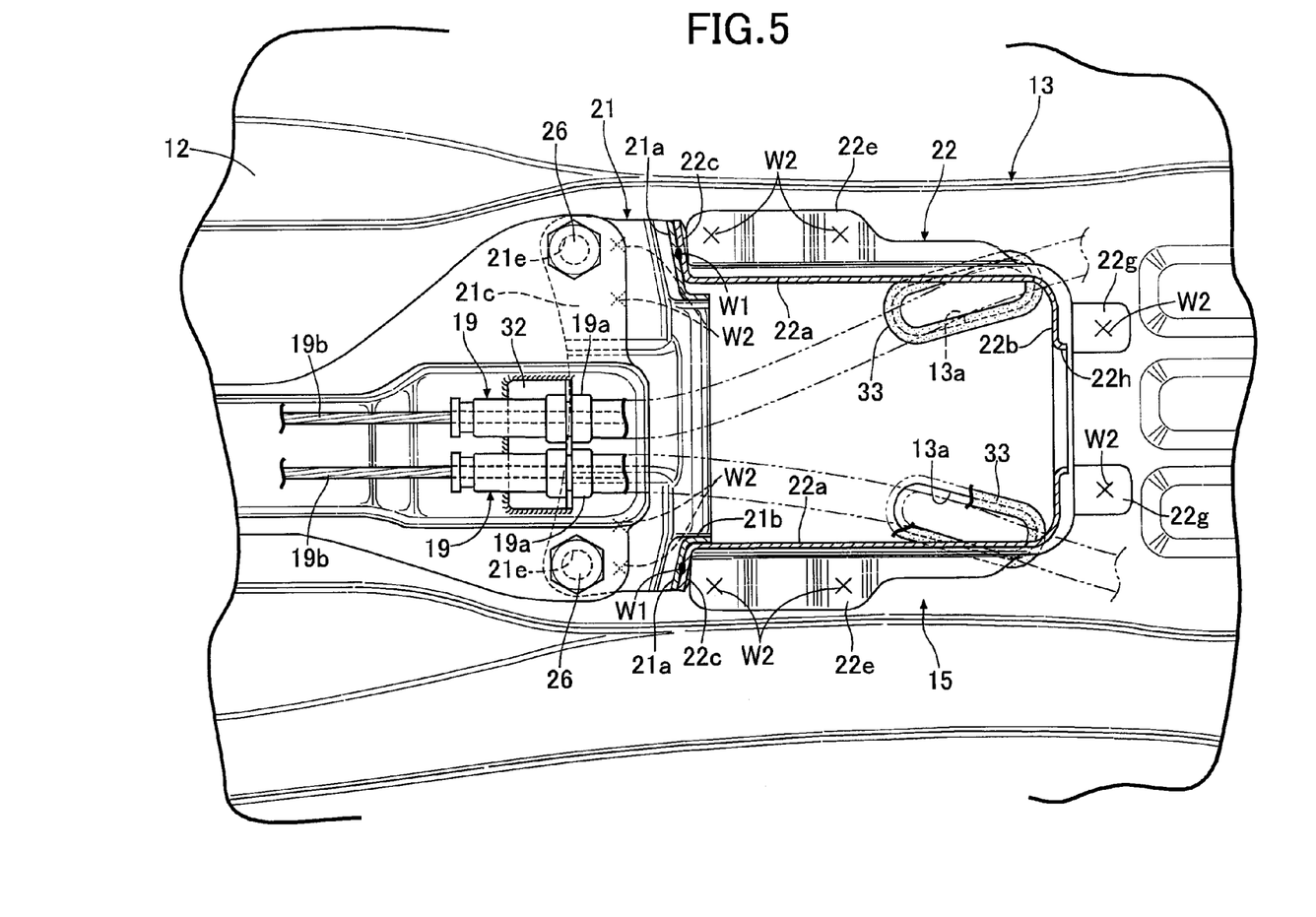
FIG. 5 is a cross-sectional view taken along a line 5-5 in FIG. 2.

As shown in FIG. 1, a floor tunnel 13 protruding upward from a floor panel 12 and extending in a front-rear direction of a vehicle body is arranged between left and right front seats 11, 11 and an upper face of the floor tunnel 13 is covered with a center console 14 having an armrest 14a. In the center console 14 and below the armrest 14a, a shock absorbing member support bracket 15 fixed to the upper face of the floor tunnel 13 and a shock absorbing member 16 fixed to an upper face of the shock absorbing member support bracket 15 are arranged. A parking brake support bracket 17 is fixed to the upper face of the floor tunnel 13 and in front of the shock absorbing member support bracket 15 and a lever portion 18a of a parking brake device 18 fixed to an upper face of the parking brake support bracket 17 protrudes into a vehicle compartment through an opening portion in the center console 14. Brake cables 19, 19 connected at their one ends to the lever portion 18a of the parking brake device 18 pass through a front wall of the shock absorbing member support bracket 15 and an upper wall of the floor tunnel 13, pass through an inside of the floor tunnel 13, and are connected to parking brakes of rear wheels.

As is clear from FIGS. 2 to 5, the shock absorbing member support bracket 15 includes a front bracket 21 and a rear bracket 22. The front bracket 21, formed by pressing sheet metal, has a plate-shaped front wall 21a extending in a left-right direction of the vehicle body, a U-shaped opening 21b is formed at an upper edge of the front wall 21a to open upward, and a lower edge of the front wall 21a is bent forward to form a mounting portion 21c. Two bolt holes 21d, 21d are formed in left and right opposite upper portions of the front bracket 21 and two bolt holes 21e, 21e are formed on left and right opposite sides of the mounting portion 21c.

The rear bracket 22 formed by pressing sheet metal has left and right side walls 22a, 22a and a rear wall 22b and is in an angular U shape in a plan view. Front edges of the side walls 22a, 22a are bent outward in the left-right direction to form mounting portions 22c, 22c and bolt holes 22d, 22d are formed in upper portions of the mounting portions 22c, 22c. Front portions of lower edges of the side walls 22a, 22a are bent outward in the left-right direction to form mounting portions 22e, 22e and notches 22f, 22f recessed upward are formed at rear portions of the lower edges of the side walls 22a, 22a. Furthermore, a lower edge of the rear wall 22b is bent rearward to form two mounting portions 22g, 22g and a circular inspection window 22h is formed in a central portion of the rear wall 22b.

The shock absorbing member 16 includes a front member 23, left and right side members 24, 24, and a rear member 25. The front member 23, formed by pressing sheet metal, includes a plate-shaped front wall 23a extending in the left-right direction of the vehicle body, mounting portions 23b, 23b bent forward at left and right side edges of the front wall 23a, and a mounting portion 23c bent forward at an upper edge of the front wall 23a. The left side member 24 includes an upper wall 24a extending in a horizontal direction, a side wall 24b extending in the front-rear direction, a leg portion 24c extending inward in the left-right direction from a lower end of the side wall 24b and then extending downward, and a bracket 24d hanging from a front end of an upper portion of the leg portion 24c. Bolt holes 24e and 24f are respectively formed in the leg portion 24c and the bracket 24d. The right side member 24 and the above-described left side member 24 are substantially bilaterally symmetrical to each other.

The rear member 25 includes a rear wall 25a extending in the left-right direction, a lower wall 25b extending horizontally forward from a lower edge of the rear wall 25a, and a pair of leg portions 25c, 25c extending downward from left and right side edges of the lower wall 25b. An upper edge and left and right opposite side edges of the rear wall 25a are bent rearward to form mounting portions 25d; 25e, 25e. Two circular lightening holes 25f, 25f are formed in the lower wall 25b, a front edge of the lower wall 25b is bent downward to form a mounting portion 25g, and bolt holes 25h, 25h are respectively formed in left and right leg portions 25c, 25c.

After welding the front wall 21a of the front bracket 21 of the shock absorbing member support bracket 15 and the mounting portions 22c, 22c of the side walls 22a, 22a of the rear bracket 22 to each other (W1), the mounting portion 21c of the front wall 21a of the front bracket 21, the mounting portions 22e, 22e of the side walls 22a, 22a of the rear bracket 22, and the mounting portions 22g, 22g of the rear wall 22b of the rear bracket 22 are welded to the upper face of the floor tunnel 13 (W2). Then, a rear end of the parking brake support bracket 17 is placed on an upper face of the mounting portion 21c of the front wall 21a of the front bracket 21 and two bolts 26, 26 passing through the rear end of the parking brake support bracket 17, the bolt holes 21e, 21e in the mounting portion 21c of the front wall 21a, and the floor tunnel 13 are screwed into weld nuts 27, 27 to thereby fasten the front bracket 21 and the parking brake support bracket 17 together. By employing the above-described structure for fastening together, the number of fastening members can be reduced and support strength of the front bracket 21 can be enhanced as compared with a case in which the front bracket 21 and the parking brake support bracket 17 are separately fastened to the floor tunnel 13.

When the shock absorbing member support bracket 15, assembled in this manner, is seen from the front-rear direction, an interval between the side walls 22a, 22a of the rear bracket 22 narrows from a lower portion toward an upper portion in a trapezoidal shape.

The shock absorbing member 16 is assembled by welding the mounting portions 23b, 23b; 23c of the front wall 23a of the front member 23, front ends of the upper walls 24a, 24a of the left and right side members 24, 24, and front ends of the side walls 24b, 24b of the left and right side members 24, 24 to each other (W3), welding mounting portions 25d; 25e, 25e of the rear wall 25a of the rear member 25, rear ends of the upper walls 24a, 24a of the left and right side members 24, 24, and rear ends of the side walls 24b, 24b of the left and right side members 24, 24 to each other (W4), welding the upper walls 24a, 24a of the left and right side members 24, 24 to each other (W5), and welding the mounting portion 25g of the lower wall 25b of the rear member 25 to a rear face of an upper portion of the front wall 23a of the front member 23 (W6). In this state, the leg portions 25c, 25c of the rear member 25 are placed on insides in the left-right direction of the leg portions 24c, 24c of the left and right side members 24, 24 and an interval between the right leg portions 24c, 25c and the left leg portions 24c, 25c narrows from a lower portion toward an upper portion in a trapezoidal shape when seen from the front-rear direction.

If the shock absorbing member 16 assembled in this manner is placed on the shock absorbing member support bracket 15, inner faces in the left-right direction of the left and right leg portions 24c, 25c; 24c, 25c of the shock absorbing member 16 come in contact with outer faces in the left-right direction of the side walls 22a, 22a, which are inclined in the trapezoidal shape, of the rear bracket 22 of the shock absorbing member support bracket 15. In this state, two bolts 28, 28 passing through the bolt holes 24e, 25h; 24e, 25h in the left and right leg portions 24c, 25c; 24c, 25c of the shock absorbing member 16 and the side walls 22a, 22a of the rear bracket 22 of the shock absorbing member support bracket 15 are screwed into weld nuts 29, 29. Two bolts 30, 30 passing through the bolt holes 22d, 22d in the rear bracket 22 of the shock absorbing member support bracket 15, the bolt holes 21d, 21d in the front bracket 21, the brackets 24d, 24d of the left and right side members 24, 24 of the shock absorbing member 16, and the front member 23 of the shock absorbing member 16 are screwed into weld nuts 31, 31.

To mount the shock absorbing member 16 on the upper portion of the shock absorbing member support bracket 15, a groove α(see FIG. 2) is formed between rear faces of the left and right brackets 24d, 24d and the front wall 23a, which are placed on each other, of the shock absorbing member 16 and front edges of the left and right leg portions 24c, 24c, and it is possible to easily position the shock absorbing member 16 with respect to the shock absorbing member support bracket 15 by engaging the groove a with the upper edge of the front wall 21a of the front bracket 21 of the shock absorbing member support bracket 15 from above and placing the inner faces of the left and right leg portions 24c, 25c; 24c, 25c of the shock absorbing member 16, which are flared in the trapezoidal shape, on the outer faces of the left and right side walls 22a, 22a of the shock absorbing member support bracket 15, which are flared in the trapezoidal shape.

With the shock absorbing member support bracket 15 and the shock absorbing member 16 fixed in upper and lower positions in a double-decker shape to the upper face of the floor tunnel 13, their left and right opposite side faces and upper face are covered with the center console 14 (see FIG. 1). Then, the other ends of outer tubes 19a, 19a of the brake cables 19, 19 having one end fixed to the upper face of the parking brake support bracket 17 through a bracket 32 are introduced into the shock absorbing member support bracket 15 through the opening 21b in the front bracket 21, pass through two openings 13a, 13a formed in the upper face of the floor tunnel 13 and covered with grommets 33, 33, and extend toward the rear wheels and inner cables 19b, 19b having one end connected to the lever portion 18a of the parking brake device 18 are slidably fitted in the outer tubes 19a, 19a.

Next, operation of the first embodiment of the present invention having the above structure will be described.

If the front seat 11 moves inward with respect to the vehicle body due to a side collision of the vehicle, an inner side face of a seat cushion of the front seat 11 collides with a side face of the shock absorbing member 16 through the center console 14 and a load is applied by a seat frame inside the front seat 11 to the shock absorbing member 16. Because the front wall 21a of the front bracket 21 of the shock absorbing member support bracket 15 receives the load in a shearing direction and therefore the shock absorbing member 16 having high strength absorbs collision energy transmitted from the front seat 11 and prevents inward movement of the front seat 11 with respect to the vehicle body to ensure a space for survival of an occupant. Particularly, the shock absorbing member 16 has a complete box structure having the front wall 23a, the rear wall 25a, the upper walls 24a, 24a, the lower wall 25b, and the left and right side walls 24b, 24b and therefore has extremely high strength to exert sufficient shock absorbing effect.

Because the parking brake device 18 and the shock absorbing member support bracket 15 are arranged on front and rear adjacent positions on the upper face of the floor tunnel 13, the brake cables 19, 19 extending rearward from the parking brake device 18 interfere with the shock absorbing member support bracket 15 to make it difficult to design layout. According to the embodiment, however, this problem can be solved by arranging the brake cables 19, 19 so that they pass through the opening 21b formed in the front wall 21a of the front bracket 21 of the shock absorbing member support bracket 15 and the openings 13a, 13a formed in the upper face of the floor tunnel 13.

On the other hand, if the opening 21b is formed in the front wall 21a of the front bracket 21 of the shock absorbing member support bracket 15, it greatly reduces strength of the front bracket 21 caused by the formation of the opening 21b and the shock absorbing member support bracket 15 is easily deformed at the time of the side collision of the vehicle. As a result, there is fear that the shock absorbing member 16 cannot exert sufficient shock absorbing effect, even though it has high strength.

According to the embodiment, however, an opening portion of an upper end of the U-shaped opening 21b in the front wall 21a of the front bracket 21 is closed with a lower end of the front member 23 of the shock absorbing member 16 and the front member 23 of the shock absorbing member 16 is reinforced by being connected to the inverted-U shaped upper walls 24a, 24a and left and right side walls 24b, 24b, thereby it is possible to sufficiently compensate for the reduction in the strength of the front bracket 21 caused by formation of the opening 21b and to increase strength of the shock absorbing member support bracket 15 and the shock absorbing member 16 in total to enhance the shock absorbing effect.

Furthermore, because the left and right leg portions 24c, 24c hanging from the left and right side walls 24b, 24b of the shock absorbing member 16 are placed over the left and right side walls 22a, 22a of the shock absorbing member support bracket 15 and fixed, it is possible to firmly integrate the shock absorbing member 16 with the shock absorbing member support bracket 15 to further enhance the shock absorbing effect.

Moreover, the inspection window 22h is formed in the rear wall 22b of the shock absorbing member support bracket 15 and therefore it is easy to maintain, through the inspection window 22h, the brake cables 19, 19 arranged inside the shock absorbing member support bracket 15. The brake cables 19, 19 are forked into two branches inside the shock absorbing member support bracket 15 and introduced into the two openings 13a, 13a in the floor tunnel 13. At this time, because the notches 22f, 22f are formed in the left and right side walls 22a, 22a of the shock absorbing member support bracket 15 and near the openings 13a, 13a, it is possible to prevent the brake cables 19, 19 forked into two branches from interfering with the shock absorbing member support bracket 15.

Figure 6:
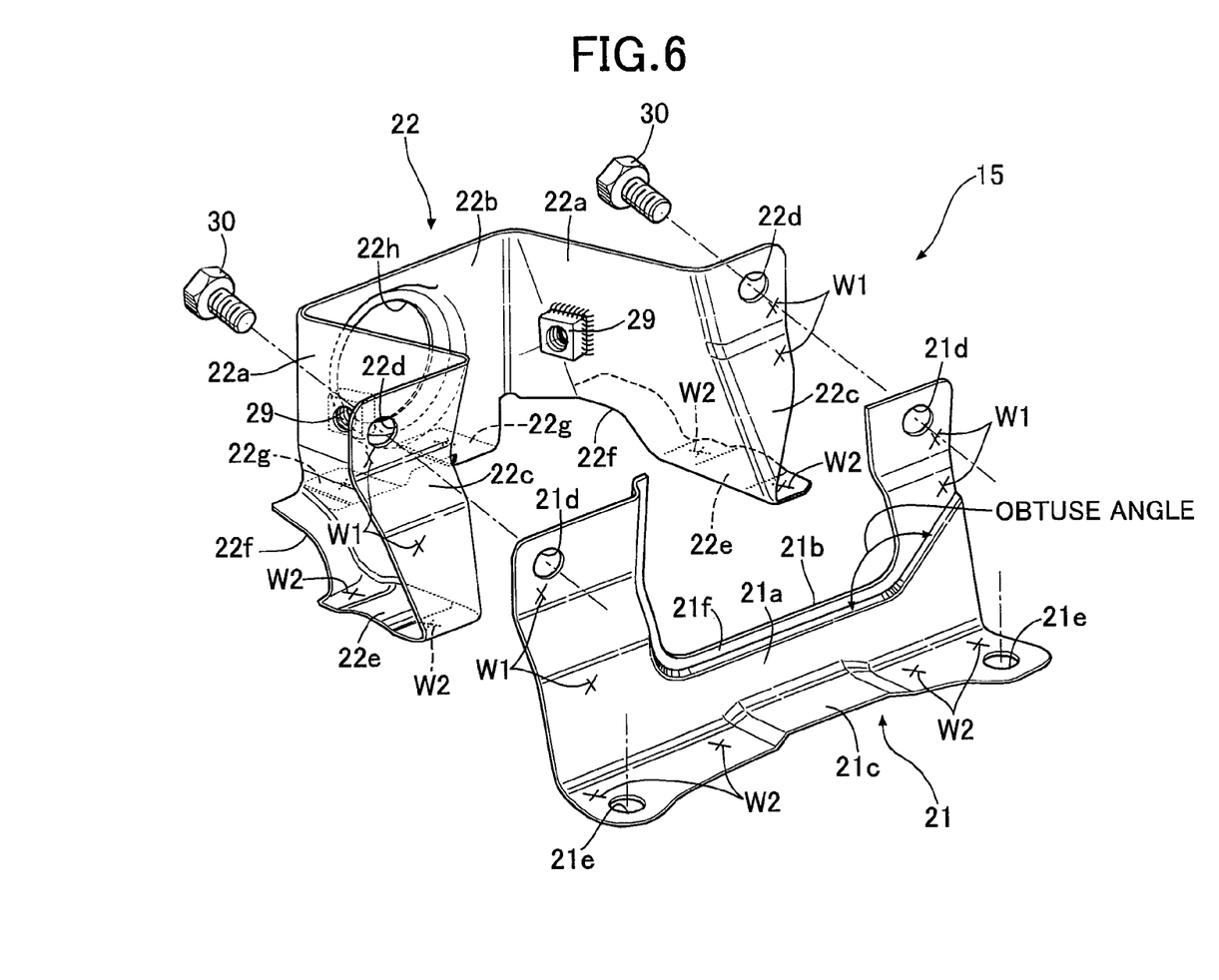
FIG. 6 is an exploded perspective view of a shock absorbing member support bracket of a second embodiment of the present invention.

Next, a second embodiment of the present invention will be described based on FIG. 6.

The second embodiment is characterized by a shape of a front bracket 21 of a shock absorbing member support bracket 15. By providing a step along a U-shaped opening 21b formed in the front wall 21a, a bead portion 21f for reinforcement is formed. The bead portion 21f is slightly displaced from the U-shaped opening 21b at a left side portion of the front bracket 21 and therefore an angle of a left corner portion of the U-shaped bead portion 21f is increased from 90 degrees to be an obtuse angle.

As a result, when a collision load of a side collision from a left side of a vehicle body is input to the front bracket 21 of the shock absorbing member support bracket 15, the reinforcing bead portion 21f formed so that its left corner portion has the obtuse angle compensates for reduction in strength of the front wall 21a due to formation of the U-shaped opening 21b to further increase strength of the front wall 21a of the shock absorbing member support bracket 15 against the side collision, prevent the shock absorbing member support bracket 15 from falling down sideways, and enhance the shock absorbing effect.

The embodiments of the present invention have been described above, but various changes in design can be made to the invention without departing from the gist of the present invention.

For example, though the shock absorbing member 16 has the complete box structure having the front wall 23a, the rear wall 25a, the upper walls 24a, 24a, the lower wall 25b, and the left and right side walls 24b, 24b in the embodiments, the lower wall 25b may be omitted. In other words, a section of the shock absorbing member 16 in the left-right direction may be an inverted-U-shaped section having the upper walls 24a, 24a and the left and right side walls 24b, 24b and open downward.

What is claimed is:

1. A shock absorbing structure for a vehicle, comprising a shock absorbing member supported on a shock absorbing member support bracket fixed onto a floor tunnel sandwiched between left and right front seats,
    wherein the front seats are caused to interfere with the shock absorbing member to absorb collision energy at the time of a side collision of the vehicle, and
    wherein the shock absorbing member has a front wall connected to an inverted-U-shaped inner face at least including an upper wall and left and right side walls, and a lower portion of the front wall is connected to an upper portion of a front wall of the shock absorbing member support bracket, and wherein leg portions hanging from left and right side walls of the shock absorbing member are placed over left and right side walls of the shock absorbing member support bracket and fixed.

2. The shock absorbing structure for a vehicle according to claim 1, wherein the left and right side walls of the shock absorbing member support bracket are inclined to approach each other as they extend upward, grooves are formed between the lower portion of the front wall and the leg portions of the shock absorbing member, and the leg portions are supported on outer faces of the left and right side walls of the shock absorbing member support bracket with the grooves engaged with the front wall of the shock absorbing member support bracket.

3. The shock absorbing structure for a vehicle according to claim 1, wherein the front wall of the shock absorbing member support bracket and a parking brake support bracket are fastened together to the floor tunnel.

4. The shock absorbing structure for a vehicle, comprising a shock absorbing member supported on a shock absorbing member support bracket fixed onto a floor tunnel sandwiched between left and right front seats,
    wherein the front seats are caused to interfere with the shock absorbing member to absorb collision energy at the time of a side collision of the vehicle, and
    wherein the shock absorbing member has a front wall connected to an inverted-U-shaped inner face at least including an upper wall and left and right side walls, and a lower portion of the front wall is connected to an upper portion of a front wall of the shock absorbing member support bracket, wherein the front wall of the shock absorbing member support bracket and a parking brake support bracket are fastened together to the floor tunnel, and wherein a rear wall of the shock absorbing member support bracket has an inspection window for maintenance of a brake cable of a parking brake device supported by the parking brake support bracket.

5. The shock absorbing structure for a vehicle according to claim 4, wherein notches through which the brake cables pass are formed in portions where left and right side walls and the rear wall of the shock absorbing member support bracket are connected.

6. A shock absorbing structure for a vehicle, comprising a shock absorbing member supported on a shock absorbing member support bracket fixed onto a floor tunnel sandwiched between left and right front seats, wherein the front seats are caused to interfere with the shock absorbing member to absorb collision energy at the time of a side collision of the vehicle, and wherein the shock absorbing member has a front wall connected to an inverted-U-shaped inner face at least including an upper wall and left and right side walls, and a lower portion of the front wall is connected to an upper portion of a front wall of the shock absorbing member support bracket, and wherein the front wall of the shock absorbing member support bracket has a U-shaped opening and a reinforcing bead portion bent at an obtuse angle is formed at an end edge of the opening at at least one of left and right side portions of the front wall of the shock absorbing member support bracket.

* * * * *